(12) United States Patent
Sasano et al.

(10) Patent No.: US 6,540,037 B2
(45) Date of Patent: Apr. 1, 2003

(54) VEHICLE FRONT END PANEL

(75) Inventors: Norihisa Sasano, Ama-gun (JP); Noriaki Maeda, Kariya (JP); Ikuo Ozawa, Toyoake (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/769,933

(22) Filed: Jan. 25, 2001

(65) Prior Publication Data

US 2001/0010275 A1 Aug. 2, 2001

(30) Foreign Application Priority Data

Jan. 28, 2000 (JP) .................................. 2000-024779

(51) Int. Cl.⁷ ............................................... B60K 11/00
(52) U.S. Cl. .................................................... 180/68.1
(58) Field of Search ........................... 180/68.1, 68.2, 180/68.3, 68.4, 68.6; 123/41.01, 41.48, 41.49, 41.65, 41.7; 165/41, 43, 122, 125

(56) References Cited

U.S. PATENT DOCUMENTS

| 1,633,093 A | * | 6/1927 | Gurney ...................... 180/68.1 |
| 1,816,373 A | * | 7/1931 | Higgins ...................... 180/68.1 |
| 4,566,407 A | * | 1/1986 | Peter ......................... 123/41.48 |
| 5,219,016 A | * | 6/1993 | Bolton et al. ................ 165/41 |
| 5,476,138 A | * | 12/1995 | Iwasaki et al. .............. 165/41 |

FOREIGN PATENT DOCUMENTS

| GB | 2080219 | * | 2/1982 |
| JP | 2109728 | * | 4/1990 |
| JP | 2158418 | * | 6/1990 |
| JP | 2220978 | * | 9/1990 |
| JP | 11-129935 | | 5/1999 |

OTHER PUBLICATIONS

US Patent Office Publication 2002/0162695 —dated Nov. 2002.*
US Patent Application 2002/0084122 –dated Jul. 4, 2002.*

* cited by examiner

Primary Examiner—Brian L. Johnson
Assistant Examiner—Bryan Fischmann
(74) Attorney, Agent, or Firm—Harness, Dickey & Pierce, PLC

(57) ABSTRACT

In a vehicle front end panel to which a front end member including at least a radiator is assembled, an air guiding portion for guiding air into the radiator is provided integrally with a body panel portion, and a low strength portion having a mechanical strength lower than that of the panel body portion is provided in the air guiding portion. Accordingly, during a minor vehicle collision, the low strength portion of the air guiding portion is preferentially broken to absorb a collision energy. Thus, collision force applied to the panel body portion can be reduced, and it can prevent the panel body portion from being broken during the minor vehicle collision.

18 Claims, 3 Drawing Sheets

VEHICLE FRONT END PANEL

CROSS-REFERENCE TO RELATED APPLICATION

This application is related to and claims priority from Japanese Patent Application No. 2000-24779 filed on Jan. 28, 2000.

BACKGROUND OF THE INVENTION

1. Field of the Invention

The present invention relates to a vehicle front end panel to which front end components including at least a radiator are assembled.

2. Description of Related Art

In a conventional front end panel described in JP-A-11-129935, an air guiding duct for introducing air to a radiator is integrated with a front side part of a panel body portion to which the radiator is assembled. However, because the panel body portion and the air guiding duct are simply integrated, the panel body portion may be damaged together with the air guiding duct when a minor vehicle collision is caused. When the panel body portion is damaged in the vehicle, it is necessary to replace the entire front end panel.

SUMMARY OF THE INVENTION

In view of the foregoing problems, it is an object of the present invention to provide a vehicle front end panel which prevents a panel body portion from being damaged during a minor vehicle collision.

According to the present invention, in a vehicle front end panel, a front end member including at least a radiator is assembled to a panel body portion, an air guiding portion for guiding air into the radiator is provided integrally with the panel body portion at a vehicle front side of the panel body portion, and the air guiding portion includes a low strength portion having a mechanical strength lower than that of the panel body portion by a predetermined degree. Therefore, during a minor vehicle collision, the low strength portion is preferentially broken to absorb a collision energy. Thus, collision force applied to the panel body portion can be reduced, and it can prevent the panel body portion from being damaged during a minor vehicle collision.

Preferably, the low strength portion has a wall thickness in the air guiding portion, thinner than that of the other portion. Therefore, the low strength portion can be readily formed to be preferentially broken during a minor vehicle collision.

More preferably, the panel body portion has a fastening portion through which a separated wall part separated from the panel body portion is fastened to the panel body portion to guide air into the radiator. Therefore, when the air guiding portion is broken during a minor vehicle collision, the air guiding portion can be repaired without replacing the entire front end panel. Accordingly, during the minor vehicle collision, the air guiding portion of the front end panel can be readily repaired at low cost.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–3. In the first embodiment, the present invention is typically applied to a vehicle where a radiator for cooling engine-cooling water, a condenser of a refrigerant cycle, and a blower unit 10 for blowing cooling air toward the radiator and the condenser are mounted on a vehicle front end portion.

Figure 1:
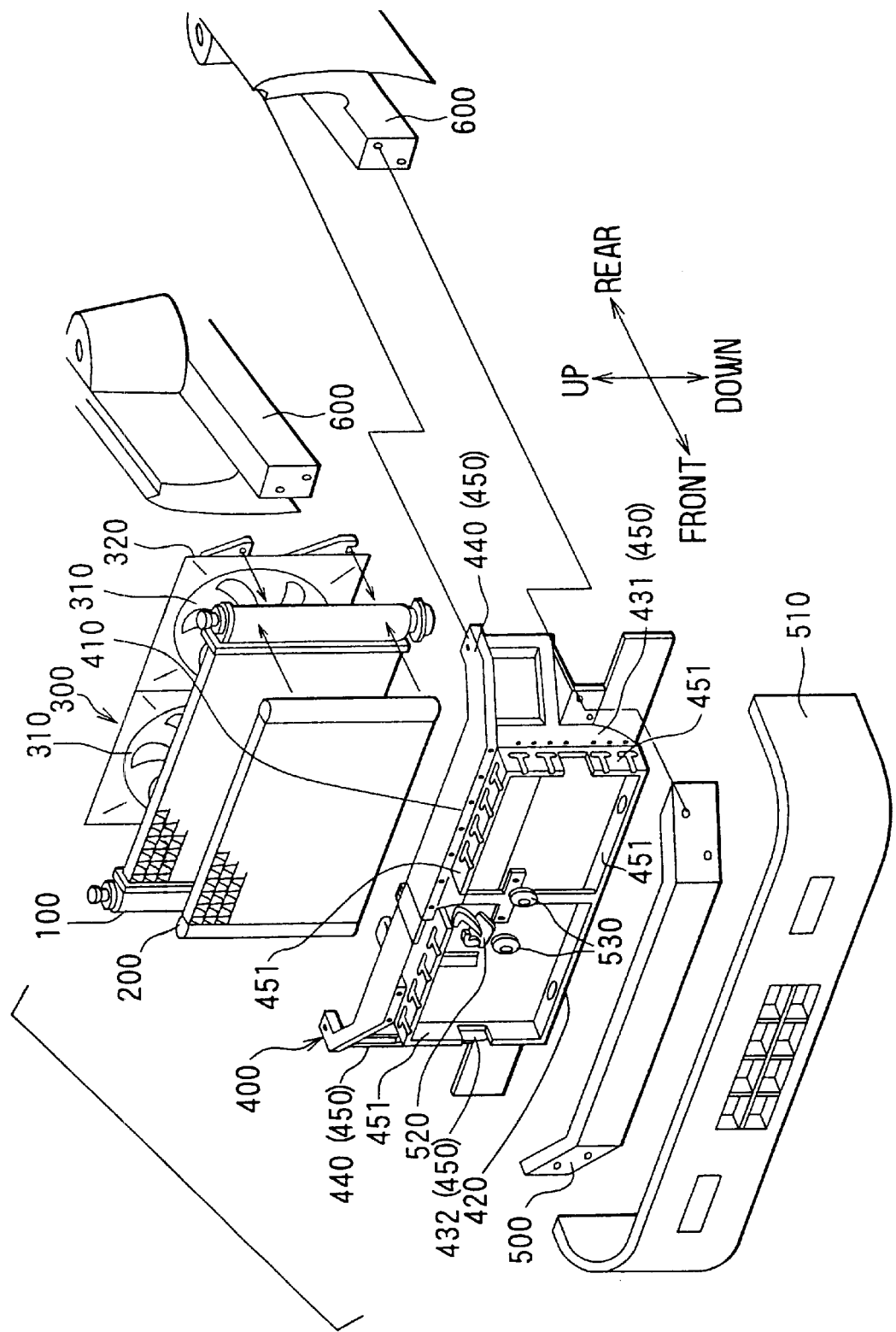
FIG. 1 is a disassembled perspective view of a vehicle front end structure with a front end panel according to a first preferred embodiment of the present invention.

As shown in FIG. 1, a radiator 100 is disposed at a vehicle rear side of a condenser 200, and a blower unit 300 for blowing air toward the radiator 100 and the condenser 200 is disposed at a vehicle rear side of the radiator 100. The blower unit 300 includes an axial flow fan 310, and a shroud 320 for holding the axial flow fan 310 and for closing a clearance between the radiator 100 and the axial flow fan 310.

The radiator 100 includes a radiator core having plural radiator tubes through which cooling water flows, and both radiator tanks connected to.both ends of each radiator tube in a longitudinal direction of the radiator tubes to communicate with each radiator tube. Similarly, the condenser 200 includes a condenser core having plural condenser tubes through which refrigerant flows, and both condenser tanks connected to both ends of each condenser tube in a longitudinal direction of the condenser tubes to communicate with each condenser tube.

A front end member including at least the radiator 100, the condenser 200 and the blower unit 300 is assembled to a panel body portion 450 of a front end panel 400 made of resin. The panel body portion 450 of the front end panel 400 includes a bracket portion 440, an upper beam 410 provided at an upper side to extend in a horizontal direction, a lower beam 420 provided at a lower side to extend in the horizontal direction, and both right and left supporting pillars 431, 432 extending in a vertical direction to connect both the upper and lower beams 410, 420. The components that make up the panel body portion 450 have reference numeral 450 behind them in parentheses.

A frame-like air guiding portion 451 (i.e., a wall part defining an air guiding duct) is provided integrally with the panel body portion 450 to protrude to a vehicle front side from the panel body portion 450. Through the air guiding portion 451, cool air (i.e., air in a vehicle traveling) can be introduced into the condenser 200 and the radiator 100 from a vehicle front side. The air guiding portion 451 is integrally formed with the panel body portion 450 using a resin. For example, in the first embodiment, the air guiding portion 451 and the panel body portion 450 are integrally molded by a polypropylene resin with glass fiber.

Figure 2A:
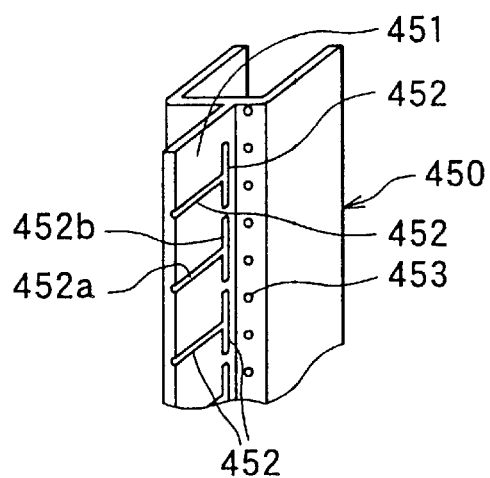
FIGS. 2A, 2B are a perspective view and a sectional view, respectively, showing a panel body portion and an air guiding portion of the front end panel according to the first embodiment.
Figure 2B:
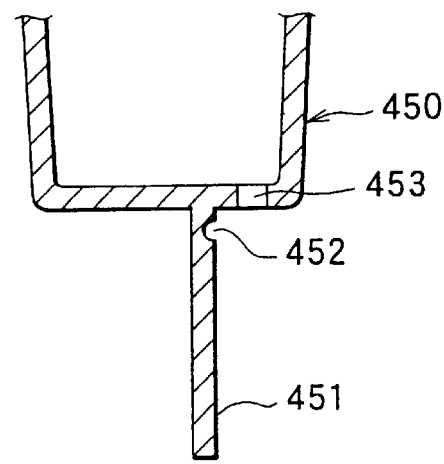

As shown in FIG. 2A, a low strength portion 452 is provided in the air guiding portion 451 to partition the air guiding portion 451 into plural plate parts. As shown in FIG. 2B, the low strength portion 452 has a thickness thinner than that of the other parts of the air guiding portion 451. Therefore, the low strength portion 452 has a mechanical strength lower than that of the other part of the panel body portion 450. Specifically, the low strength portion 452 is constructed by plural first recesses 452a each of which extends in a vehicle front-rear direction, and plural second recesses 452b each of which extends in a direction perpendicular to the vehicle front-rear direction. As shown in FIG. 2A, the plural first recesses 452a and the plural second recesses 452b are constructed to form plural approximate T-shaped recess parts.

Figure 3:
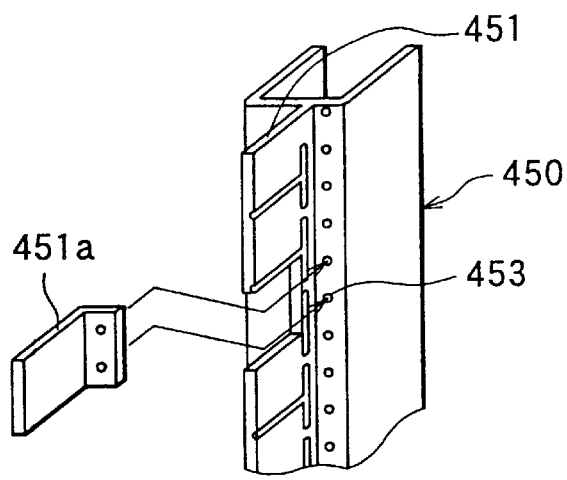
FIG. 3 is a disassembled perspective view for an air guiding portion to be assembled to the panel body portion according to the first embodiment.

Plural bolt holes (fastening portion) 453 are provided in the panel body portion 450 for assembling a separated air guiding portion 451a separately formed from the panel body portion 450 to the panel body portion 450 using a bolt such as a tapping screw, as shown in FIG. 3. In the first embodiment, because the separated air guiding portion 451a is assembled to the panel body portion 450 by a tapping screw, male screws are not necessary to be provided in the bolt holes 453.

As shown in FIG. 1, a bumper 500 (buffer member) made of a metal is covered by a bumper cover 510 made of a resin. The bumper 500 and the front end panel 400 are fixed to vehicle side bodies 600 by a fastening member such as a bolt.

In the first embodiment, after the condenser 200 and the blower unit 300 are assembled to the radiator 100 to be fixed to the radiator 100 by using a fastening member such as a bolt through a stay, this integrated part is assembled to the front end panel 400. Further, as shown in FIG. 1, a hood lock 520 for opening and closing a bonnet (engine hood), and a horn 530 for generating a warning sound are attached to the panel body portion 450.

According to the first embodiment of the present invention, the low strength portion 452 having a mechanical strength lower than that of the panel body portion 450 is provided in the air guiding portion 451. Therefore, when a vehicle slightly collides with an object from a vehicle front side, the low strength portion 452 is preferentially readily broken so that a collision energy is absorbed by the low strength portion 452. Accordingly, during a minor vehicle collision, it can prevent the panel body portion 450 from being damaged.

In the first embodiment, because the low strength portion 452 is formed to partition the air guiding portion 451 into the plural plate parts, the air guiding portion 451 is broken in a block of each plate part. For example, when one plate part of the air guiding portion 451 is broken, the separated air guiding portion 451a is assembled to the panel body portion 450 using a tapping screw, as shown in FIG. 3. Therefore, the air guiding portion 451 can be repaired in low cost without changing all the front end panel 400.

A second preferred embodiment of the present invention will be now described with reference to FIGS. 4A and 4B. In the above-described first embodiment, because the plural T-shaped recess parts are provided in the air guiding portion 451 integrated with the panel body portion 450 of the front end panel 400 to form the low-strength portion 452, it is necessary to have a core such as a slide die when the front end panel 400 is molded using resin.

Figure 4A:
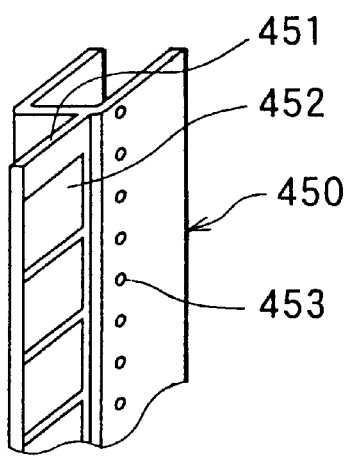
FIGS. 4A, 4B are a perspective view and a sectional view, respectively, showing a panel body portion and an air guiding portion of a front end panel according to a second preferred embodiment of the present invention.
Figure 4B:
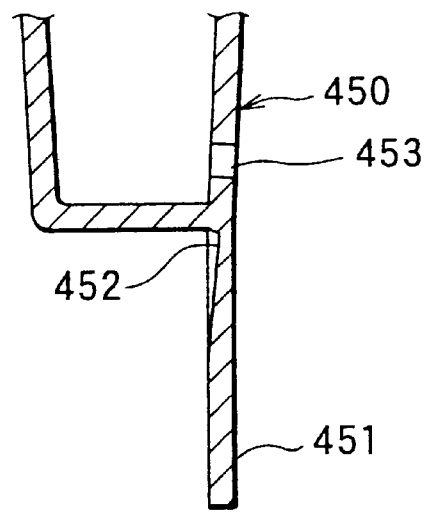

However, in the second embodiment, as shown in FIGS. 4A and 4B, a wall thickness of the air guiding portion 451 is made to be thinned from a top end side (front end side) to a base end side (rear end side) of the air guiding portion 451 in a part of the air guiding portion 451 so that a low strength portion 452 is formed. In the second embodiment, a portion is made thinner in a resin-molding die at a position corresponding to the low strength portion 452. That is, the portion of the resin-molding die is formed to correspond to the wall thickness of the low strength portion 452. Further, each recess of the low strength portion 452 is formed to have a rectangular shaped plate part. Accordingly, when a slight collision is caused in a vehicle fro a vehicle front side, the low strength portion 452 is preferentially readily broken so that a collision energy is absorbed by the low strength portion 452. Thus, during a minor vehicle collision, it can prevent the panel body portion 450 fro being damaged. As a result, when one plate part of the air guiding portion 451 is broken, a separated air guiding portion can be assembled to the panel body portion 450 using a fastening member, similarly to the above-described first embodiment. Therefore, the air guiding portion 451 can be repaired at low cost without changing all the front panel 400.

Figure 5:
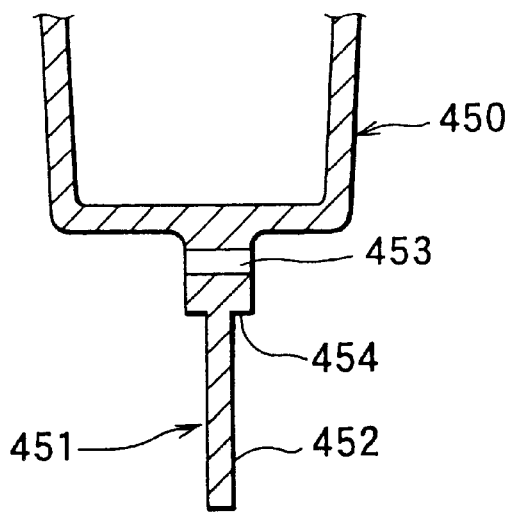
FIG. 5 is a sectional view showing a panel body portion and an air guiding portion of a front end panel according to a third preferred embodiment of the present invention.

A third preferred embodiment of the present invention will be now described with reference to FIG. 5. In the third embodiment, as shown in FIG. 5, a step portion 454 is provided at a base end side (rear end side) of the air guiding portion 451 so that a wall thickness of the air guiding portion 451 at the base end side is made thicker than that of the air guiding portion 451 at the other side. That is, the step portion 454 is provided at the base end side of the air guiding portion 451 so that the thinned part of the air guiding portion 451 constructs a low strength portion 452 which is preferentially broken during a minor vehicle collision. The bolt holes 453 are provided in the thickened wall part at the base end side of the air guiding portion 451. Actually, in the third embodiment, the thickened parts at the base end side of the air guiding portion 451 is a part of the panel body portion 450.

Although the present invention has been fully described in connection with the preferred embodiments thereof with reference to the accompanying drawings, it is to be noted that various changes and modifications will become apparent to those skilled in the art.

For example, in the above-described embodiments, the bolt holes 453 are provided while the front end panel 400 is manufactured. However, the bolt holes 453 may be not provided while the front end panel 400 is manufactured, but a marking is performed at positions corresponding to the bolt holes 453. In this case, when the separated air guiding portion is assembled to the panel body portion 450 in a repairing operation after a minor vehicle collision, the bolt holes 453 may be provided by a hole opening member such as a drill.

In the above-described first embodiment, the separated air guiding portion 451a is assembled to the panel body portion 450 using a bolt such as a tapping screw. However, the separated air guiding portion 451a may be assembled to the panel body portion 450 by using a fastening member such as a pin. In this case, instead of the bolt holes 453, an engagement member such as an engagement protrusion may be provided in the panel body portion 450.

In the above-described embodiment, the panel body portion 450 and the air guiding portion 451 are integrally formed by using a resin. However, the panel body portion 450 and the air guiding portion 451 may be formed integrally by using a metal material having a collision resistance (mechanical strength) lower than that of the vehicle side body 600, such as an aluminum material and a magnesium material.

Such changes and modifications are to be understood as being within the scope of the present invention as defined by the appended claims.

What is claimed is:

1. A front end structure for a vehicle, comprising:
   a front end member including at least a radiator, the front end member being mounted on the vehicle at a vehicle front end side;
   a panel body portion to which the front end member is assembled; and
   an air guiding portion provided integrally with the panel body portion at a vehicle front side of the panel body portion to extend from the panel body portion in a vehicle front-rear direction, the air guiding portion having a duct shape for guiding air into the radiator while restricting air flow between the radiator and the panel body portion, wherein:
   the air guiding portion includes a low strength portion having a mechanical strength lower than that of the panel body portion by a predetermined degree.

2. The front end structure according to claim 1, wherein the low strength portion has a wall thickness in the air guiding portion, thinner than that of the other portion.

3. The front end structure according to claim 1, wherein the panel body portion has a fastening portion through which a separated wall part separated from the panel body portion is fastened to the body portion to guide air into the radiator.

4. The front end structure according to claim 1, wherein the low strength portion is provided in the air guiding portion in such a manner that a part of the air guiding portion is broken when an exterior force larger than a predetermined value is applied to a vehicle body from a vehicle front side.

5. The front end structure according to claim 4, wherein the panel body portion has a fastening portion through which a separated wall part separated from the body portion is assembled to the panel body portion instead of the broken part of the air guiding portion.

6. The front end structure according to claim 1, wherein the air guiding portion is provided to form an air duct extending from the panel body portion through which air is directly introduced into the radiator.

7. The front end structure according to claim 1, wherein the panel body portion and the air guiding portion are integrally molded by resin.

8. The front end structure according to claim 1, wherein the air guiding portion protrudes from the panel body portion in an approximate rectangular shape.

9. The front end structure according to claim 1, wherein:
   the panel body portion includes an upper beam extending approximately horizontally at an upper side of the radiator, first and second supporting members extending approximately vertically to be connected to the upper beam at two sides of the radiator; and
   the air guiding portion protrudes from the upper beam and the first and second supporting members toward the vehicle front side to have the duct shape.

10. The front end structure according to claim 1, wherein:
    the panel body portion includes first and second members extending approximately vertically at two sides of the radiator; and
    the air guiding portion is provided to protrude from front surfaces of the first and second members to the vehicle front side to form the duct shape.

11. The front end structure according to claim 1, wherein the low strength portion is provided in the air guiding portion, for dividing the air guiding portion into a plurality of divided members at least in a vertical direction.

12. The front end structure according to claim 11, wherein the low strength portion is provided in the air guiding portion for dividing the air guiding portion into a plurality of divided members in both the vertical direction and a horizontal direction.

13. The front end structure according to claim 1, wherein:
    the air guiding portion includes an upper and lower wall extending approximately horizontally at upper and lower sides of the radiator, and two side walls extending approximately vertically at right and left sides of the radiator; and
    each of the upper and lower walls and the two side walls of the air guide portion extends from the panel body portion in the vehicle front-rear direction at a position around the radiator.

14. A front end structure for a vehicle comprising:
    a front end member including at least a radiator, the front end member being mounted on the vehicle at a vehicle front end side;
    a panel body portion to which the front end member is assembled;
    an air guiding portion, provided integrally with the panel body portion at a vehicle front side of the panel body portion, for guiding air into the radiator, and
    the air guiding portion includes a low strength portion having a mechanical strength lower than that of the panel body portion by a predetermined degree; wherein:
    the low strength portion includes plural approximate horizontal recesses each of which extends in a vehicle front-rear direction; and
    the approximate horizontal recesses have a wall thickness thinner than that of the other part of the air guiding portion.

15. The front end structure according to clime 14, wherein:
    the low strength portion further includes plural approximate vertical recesses each of which extends in a direction approximately perpendicular to the vehicle front-rear direction; and
    the approximate vertical recesses having a wall thickness thinner than that of the other part of the air guiding portion is provided at a vehicle rear side of the approximate horizontal recesses to form approximate T-shaped plural recess in the air guiding portion.

16. The front end structure according to claim 14, wherein the low strength portion is provided in the air guiding portion in such a manner that a wall thickness at each approximate horizontal recess is thinned from a vehicle front side to a vehicle rear side.

17. A front end structure for a vehicle, comprising:
    a front end member including at least a radiator, the front end member being mounted on the vehicle at a vehicle front end side;
    a panel body portion to which the front end member is assembled; and
    an air guiding portion provided integrally with the panel body portion at a vehicle front side of the panel body portion for guiding air into the radiator, wherein:
    the air guiding portion includes a low strength portion having a mechanical strength lower than that of the panel body portion by a predetermined degree;

the panel body portion includes upper and lower beams extending approximately horizontally, and first and second supporting members extending approximately vertically to be connected to the upper and lower beams at two sides of the radiator; and the air guiding portion is provided to protrude from the upper and lower beams and the supporting members.

18. A front end structure for a vehicle comprising:

a front end member including a radiator, the front end member being mounted on the vehicle at a vehicle front end;

a panel body portion to which the front end member is mounted; and an air guiding portion provided integrally with the panel body portion, the air guide portion extending away from the radiator, the air guide portion forming a generally rectangular duct for guiding air into the radiator; wherein the air guiding portion includes a low strength portion having a mechanical strength lower than that of the panel body portion.

* * * * *